(12) United States Patent
Ohashi

(10) Patent No.: US 7,771,134 B2
(45) Date of Patent: Aug. 10, 2010

(54) IMAGE RECORDING APPARATUS INCLUDING CUTTING UNIT AND GUIDE MEMBER WITH FRICTION MEMBER

(75) Inventor: Takakazu Ohashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1227 days.

(21) Appl. No.: 11/344,504

(22) Filed: Jan. 31, 2006

(65) Prior Publication Data

US 2006/0170983 A1 Aug. 3, 2006

(30) Foreign Application Priority Data

Feb. 1, 2005 (JP) .............................. 2005-024827

(51) Int. Cl.
*B41J 11/66* (2006.01)
(52) U.S. Cl. ....................... 400/621; 400/583; 400/642; 347/104
(58) Field of Classification Search ................. 400/621, 400/642, 583
See application file for complete search history.

(56) References Cited

U.S. PATENT DOCUMENTS 5,115,322 A * 5/1992 Jang ........................... 358/304
5,649,776 A * 7/1997 Sugimoto et al. ............ 400/617
6,520,634 B2 * 2/2003 Yoshinaga et al. .......... 347/102
6,652,173 B1 * 11/2003 Martini et al. ............... 400/621
7,241,063 B2 * 7/2007 Sago et al. ................... 400/621
2001/0039866 A1 * 11/2001 Kohda et al. .................. 83/487

FOREIGN PATENT DOCUMENTS

| JP | 5-147385 A | 6/1993 |
| JP | 5-254194 A | 10/1993 |
| JP | 11-078140 A | 3/1999 |

\* cited by examiner

*Primary Examiner*—Leslie J Evanisko
(74) *Attorney, Agent, or Firm*—Canon U.S.A., Inc. I.P. Division

(57) ABSTRACT

The image coding apparatus includes conveying unit configured to convey a roll-shaped recording medium, a recording head adapted to record an image on the recording medium, a guide member configured for guiding the recording medium, and a cutting unit configured to cut the recording medium, wherein the guide member is provided with at least one friction member on a surface of the guide member, the at least one friction member configured to come into contact with the recording medium.

4 Claims, 6 Drawing Sheets

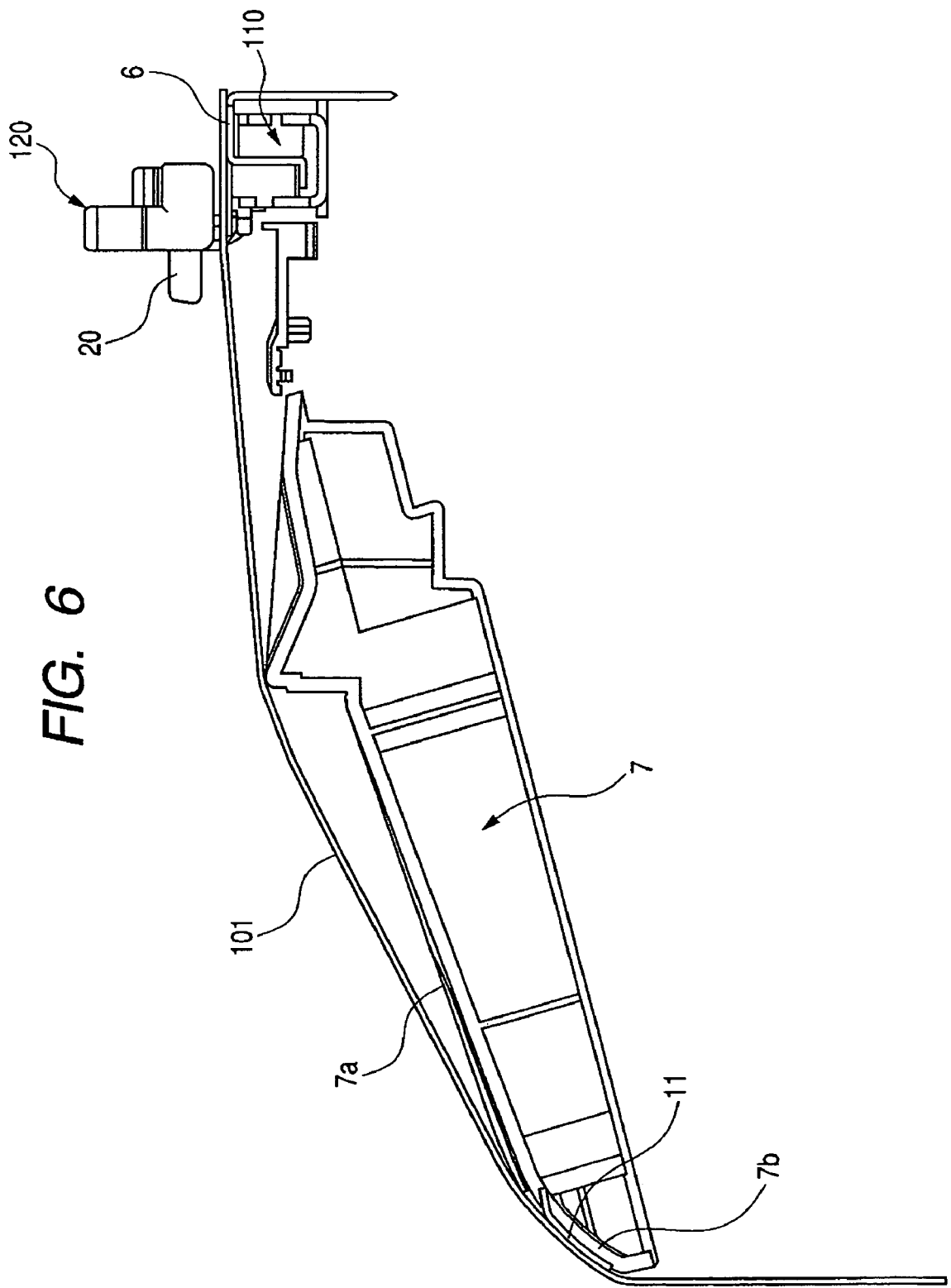

IMAGE RECORDING APPARATUS INCLUDING CUTTING UNIT AND GUIDE MEMBER WITH FRICTION MEMBER

BACKGROUND OF THE INVENTION

1. Field of the Invention

The present invention relates to an image recording apparatus such as a printer, a copying apparatus or a facsimile, having a cutting unit for cutting a roll-shaped recording medium.

2. Description of the Related Art

There are already commercially available image recording apparatuses having a printer function for recording an image on a recording medium based on image information, composite apparatuses having a facsimile function, an original reading function, an image pickup function and the like in addition to the printer function, and systems constituted by connecting such image recording apparatuses to host equipment such as computers.

The image recording apparatus employed in such apparatuses sometimes performs image recording on a roll-shaped recording medium such as a recording paper or a recording film. In the present application, a "rolled sheet" may be defined as a roll-shaped recording medium, and further the material thereof is not limited to a paper or a plastic sheet.

An image recording apparatus for image recording on a roll-shaped recording medium may include a cutting unit (cutting mechanism) for cutting the recording medium. As for the cutting unit, there is already known an apparatus for cutting the recording medium by a pair of cutting blades. Such cutting unit is used, for example in an image recording apparatus for image recording on a roll-shaped recording medium conveyed in the apparatus, for cutting the recording medium after recording into a predetermined length at a discharge thereof. Such cutting units may include a type utilizing a knife-shaped blade, a type utilizing a pair of blades of which one is an elongated fixed blade and the other is a rotatable circular blade, and a type utilizing a pair of rotatable circular blades.

Such image recording apparatuses are constructed so as to store a roll-shaped recording medium, to record image data by a scanning (reciprocating) motion of a recording head, and to cut the recording medium after image data recording into each page. More specifically, the recording medium is supplied to a platen when image data are entered. Above the platen, there is provided a recording head for executing a recording by ink discharge under a reciprocating motion. An image of a line is recorded on the recording medium by a scanning motion of the recording head, and, after the recording medium is advanced by a predetermined distance by a conveying roller, an image of a line is recorded again by a scanning motion of the recording head. Thus an image is recorded on an entire page by repeating the recording of a line image and the conveying of the recording medium by a predetermined distance. Then a recorded portion of the recording medium is guided to a sheet discharge member provided outside the apparatus, and is cut into each page by the cutting unit. The recording medium cut into each page is stored on a stacking member provided below the sheet discharge member.

In the case of cutting the recording medium in the serial operations as described above, the cutting operation is executed from a lateral end of the recording medium to the other lateral end thereof, and, in case the recording medium has a large width, an already cut portion of the recording medium may be displaced downwards by the weight thereof in the course of the cutting operation. For this reason, the recording medium may not be cut linearly but may show a curved cut edge or may be torn off at an end portion of the cut edge.

In order to prevent such a situation, Japanese Patent Application Laid-Open No. H05-147385 discloses a structure for pressing, at the cutting of the recording medium, a position thereof at a sheet discharge side with respect to a cutting line by a lower end of a cover, thereby, preventing a displacement of the recording medium and enabling an exact cutting of the recording medium.

Also Japanese Patent Application Laid-Open No. H05-254194 discloses a structure of extending, at the cutting of the recording medium, a pressing belt for pressing the recording medium along with the movement of a cutter unit, thereby, preventing a displacement of the recording medium and enabling an exact cutting of the recording medium.

Moreover, Japanese Patent Application Laid-Open No. H11-78140 discloses a structure for pressing, at the cutting of the recording medium, a lateral edge at the cutting start side, thereby, preventing a displacement of the recording medium and enabling an exact cutting of the recording medium.

However the structure disclosed in Japanese Patent Application Laid-Open No. H05-147385 is associated with several technical drawbacks. For instance, the pressing member has to be separated from the recording medium at the conveying motion thereof and to be pressed thereon at the cutting operation. Moreover, the pressing member, formed by a cover, provides a bulky and complex apparatus with an elevated cost. Also, since the recorded surface (image bearing surface) of the recording medium has to be pressed, the recorded image may be damaged in case of recording a frameless image.

Also, the structure disclosed in Japanese Patent Application Laid-open No. H05-254194 is associated with a drawback. In particular, since the recorded surface has to be pressed with the pressing belt, the recorded image may be damaged in case of recording a frameless image.

Additionally, the structure disclosed in Japanese Patent Application Laid-open No. H11-78140 has some disadvantages. For instance, it requires a mechanism which separates a pressing member from the recording medium when it is conveyed and which presses the recording medium from above at the cutting operation of the recording medium. Such structure is associated with drawbacks of requiring a complex mechanism with an increased cost, and therefore, since the recorded surface has to be pressed, the recorded image may be damaged in case of recording a frameless image.

SUMMARY OF THE INVENTION

The present invention has been made in consideration of the technical situation explained in the foregoing. An aspect of the present invention is to provide an image recording apparatus capable of avoiding damage to the recording surface in case of recording a frameless image, without resulting in bulkiness or complication of the apparatus. Another aspect of the present invention is also to provide an image recording apparatus capable of exactly cutting a recording medium along a cut line and preventing a downward displacement of an already cut portion by the weight thereof in the course of a cutting operation. The present invention further provides an image recording apparatus capable of preventing the recording medium from being torn off near an end of the cutting operation.

The aforementioned aspects and features can be attained, according to the present invention, by an image recording apparatus including conveying unit configured to convey a roll-shaped recording medium, a recording head adapted to record an image on the recording medium, a guide member configured for guiding the recording medium, and a cutting unit configured to cut the recording medium, wherein the guide member is provided with at least one friction member configured to come into contact with the recording medium.

The present invention allows to provide an image recording apparatus capable, in cutting a roll-shaped recording medium conveyed by the conveying unit, of preventing a damage on a recording surface when recording a frameless image, while preventing the apparatus from becoming bulky or complicated. Also there is provided an image recording apparatus capable of exactly and easily cutting the recording medium along a cut line while preventing, in the course of a cutting operation, an already cut portion from being displaced downwards by a weight thereof and also preventing that the recording medium is torn off near an end of the cutting operation. Further features and advantages of the present invention will become apparent from the following description of exemplary embodiments (with reference to the attached drawings).

BRIEF DESCRIPTION OF THE DRAWINGS

FIG. 6 is a schematic cross-sectional view showing a state where a recording medium conveyed from a recording part is cut and discharged, according to an aspect of the present invention.

DETAILED DESCRIPTION OF THE PREFERRED EMBODIMENTS

Figure 1:
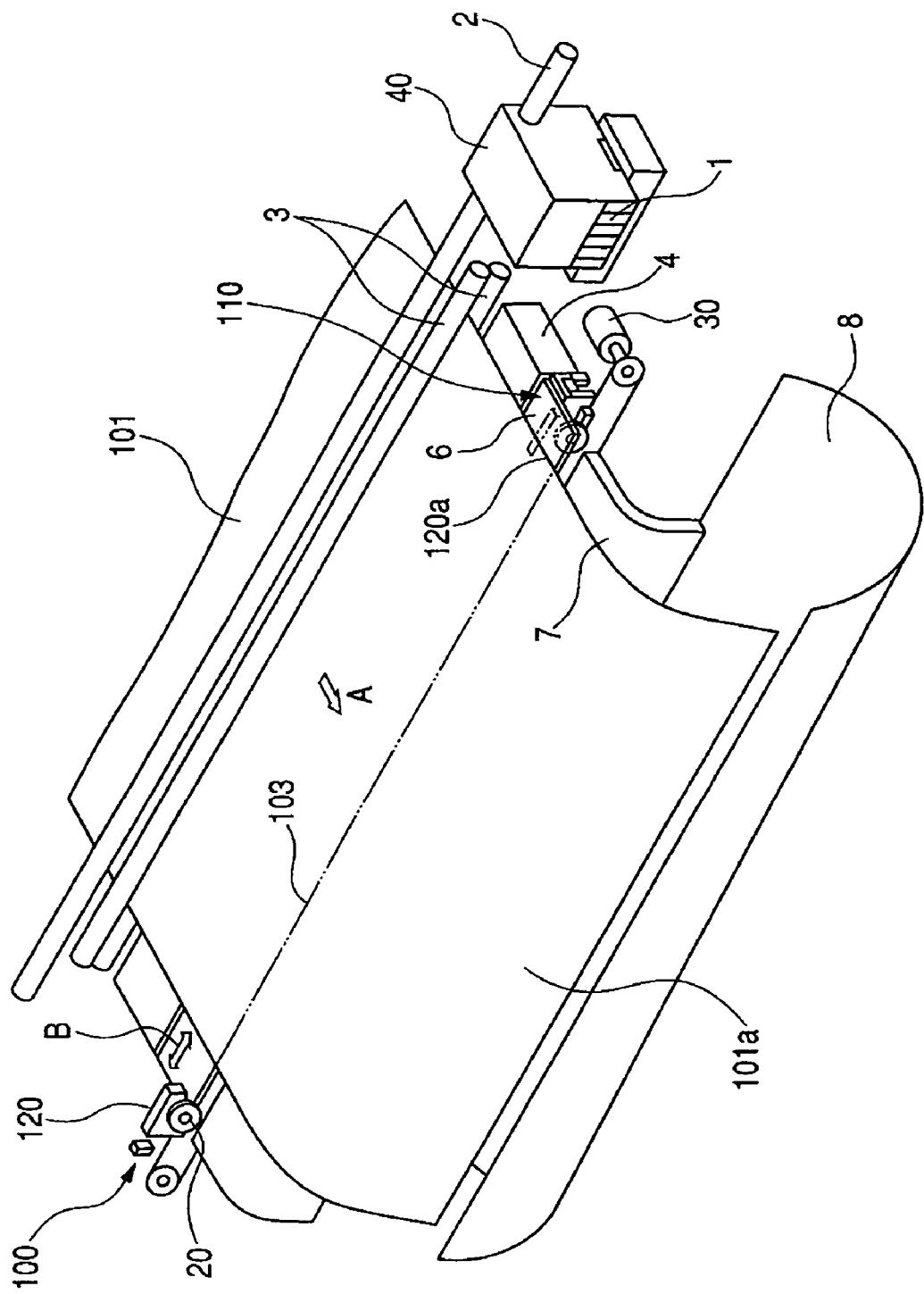
FIG. 1 is a schematic perspective view of an exemplary embodiment of an image recording apparatus according to the present invention.

In the following, embodiments of the present invention will be explained with reference to the accompanying drawings, in which like reference characters designate the same or similar parts throughout the drawings.

FIG. 1 is a schematic perspective view of an exemplary embodiment of an image recording apparatus of the present invention. Referring to FIG. 1, a carriage 40 supporting a recording head 1 which functions as recording unit is supported as to be capable of a reciprocating motion along a rail 2 serving as a scanning guide, provided in a main body of the apparatus. A roll-shaped recording medium (rolled sheet) 101, supplied in a recording part, is conveyed by a pair of conveying rollers 3 constituting a conveying unit. The rolled sheet 101 is a continuous recording medium constituted of a roll-shaped recording paper or plastic sheet, and is not limited to a paper.

In the recording part, a platen 4 is provided for guiding and supporting the recording medium 101 from a rear side. The platen 4 serves also as a chassis of the main body of the apparatus, and secures a gap between the recording head 1 and the recording medium 101. When an image of a line is recorded in the recording part by a forward or reverse scanning motion of the recording head 1, the recording medium 101 is advanced with the conveying rollers 3 in a direction A by a predetermined pitch, and the recording head 1 is moved again to execute an image recording of a next line. An image is thus recorded on an entire page by repeating these operations. A recorded portion 101a of the recording medium is conveyed to the exterior of the main body of the apparatus, by guiding with a sheet discharge member (guide member) 7. In the present embodiment, upon completion of the image recording, the recording medium 101 is conveyed by the conveying rollers 3 to a cutting position at a downstream side of the platen 4 in the conveying direction.

At the cutting position, there is provided a cutting unit (cutting mechanism) 100 for cutting the recording medium 101 along a cut line 103. When the image recording is completed, the recording medium 101 is conveyed by the conveying rollers 3 to a predetermined cutting position. Then, in response to a cutting operation signal, a motor 30 is activated, thereby, driving a circular blade unit 120, capable of moving in a direction B along a fixed blade 6 of a fixed blade unit 110, from a cutting start position at the left-hand side to a cutting end position 120a at the right-hand side. In this operation, the rolled sheet 101 is cut along the cut line 103, thereby separating a recorded portion 101a at the downstream side in the conveying direction (indicated by an arrow A). The cut line 103 coincides with a blade edge of the fixed blade 6.

At the downstream side of the cutting unit 100 in the conveying direction, there is not provided paired sheet discharge rollers for pinching the sheet (recording medium) nor any other pinching unit. Therefore, the recorded portion 101a cut into a sheet drops by the weight thereof onto a stacking member 8 provided below the sheet discharge member 7, and is thus discharged. An upper surface of the fixed blade 6 is set at such a height somewhat lower than a sheet passing surface of the platen 4 (an upper surface in the illustrated example), and an upper surface of the sheet discharge member 7 is set at such a height somewhat lower than the upper surface of the fixed blade 6. That is to say, these members are so set as to become lower in succession, in the conveying direction of the recording medium 101.

Figure 2:
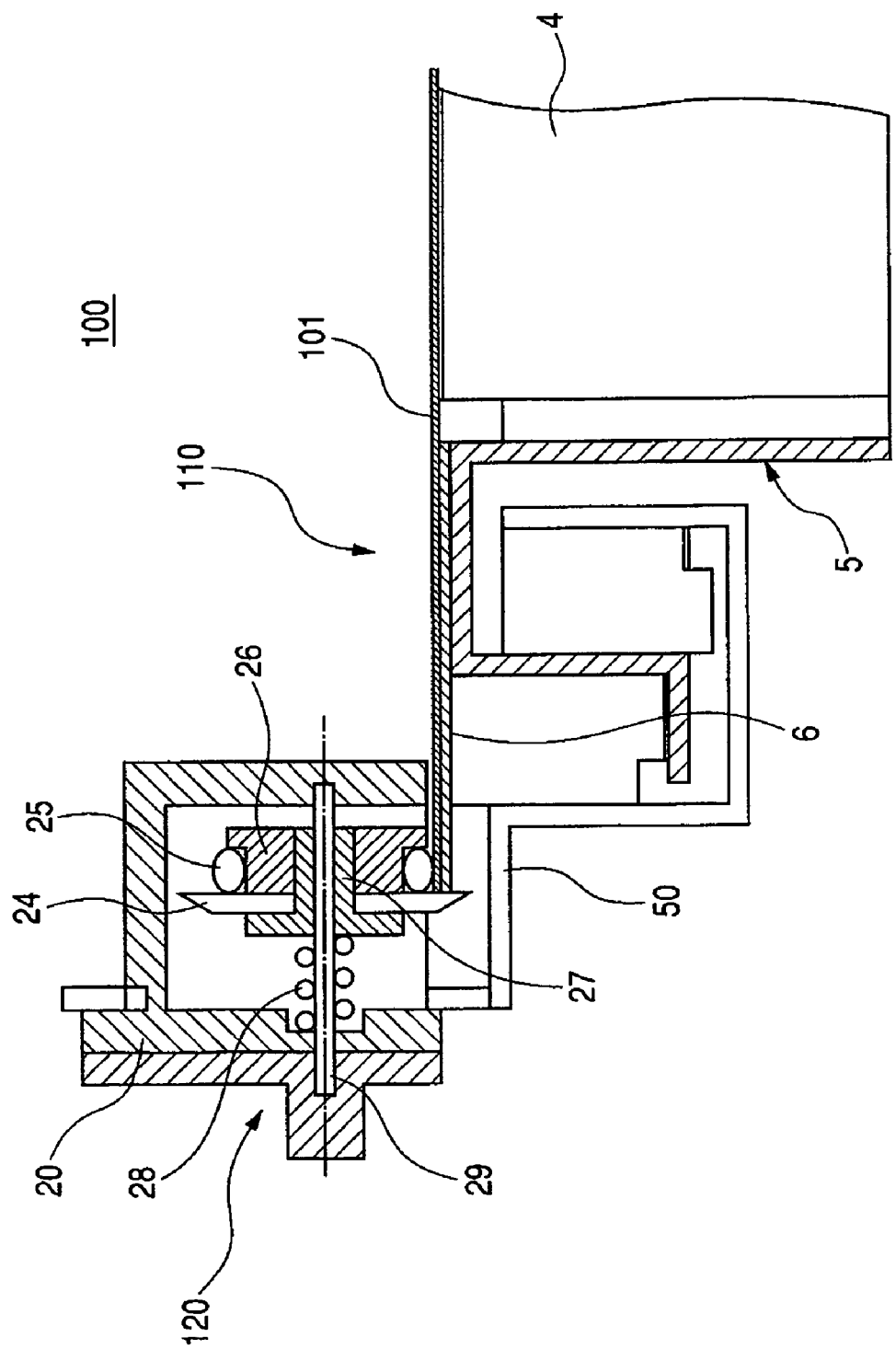
FIG. 2 is a schematic vertical cross-sectional view showing an exemplary configuration of cutting unit from FIG. 1.

FIG. 2 is a schematic vertical cross-sectional view showing an exemplary configuration of the cutting unit 100 in FIG. 1. Referring to FIG. 2, the fixed blade unit 110 is constructed by fixing a linear fixed blade 6 on a fixed frame 5 mounted on the platen 4. The fixed blade 6 is fixed on an upper surface of the fixed frame 5 by a double-stick tape, an adhesive or a spot welding along a widthwise direction of the recording medium 101. A circular blade unit 120 is mounted on a movable support member 50, mounted movable along a guide portion of the fixed frame 5 and along the widthwise direction of the recording medium 101, and a circular blade holder 20 is replaceably mounted on the circular blade unit 120.

The circular blade holder 20 has a cylindrical shape (see also FIG. 1), and accommodates therein a circular blade 24, having a disk shape and provided with a blade along the periphery thereof, in rotatable manner. The circular blade holder 20 is provided, on a bottom face thereof, with an aperture for permitting the blade of the circular blade 24 to protrude. On a shaft member 29, for supporting the circular blade 24, a bearing 27 biased toward the right-hand side by a coil spring 28 is axially slidably fitted. On a cylindrical surface of the bearing 27, the circular blade 24 is positioned and supported by a pinching member 26. The circular blade 24 is positioned and supported as to assume an illustrated position with respect to the distal edge of the fixed blade 6. More specifically, the distal edge of the fixed blade 6 is in contact with a proximity of an edge on a surface of the circular blade 24. In the present embodiment, when the recording medium 101 is cut along the cut line 103, the recording medium 101 is pressed onto the upper surface of the fixed blade 6 by an O-ring 25. The O-ring 25 rolls on the recording medium 101 by a frictional force caused by such pressing, thereby rotating the circular blade 24.

Figure 3:
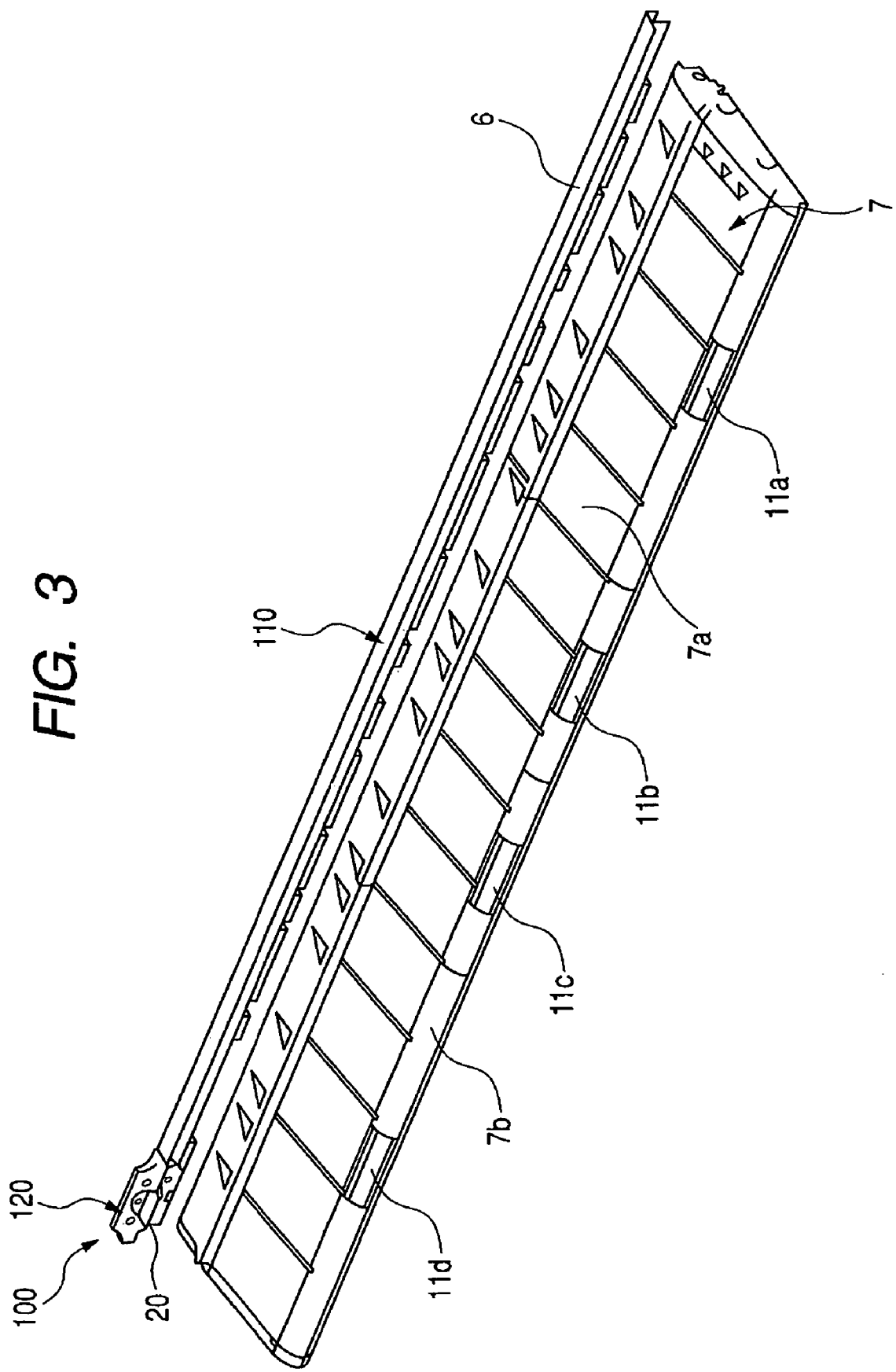
FIG. 3 is a schematic perspective view showing an exemplary sheet discharge member from FIG. 1, together with the cutting unit.

FIG. 3 is a schematic perspective view showing an exemplary sheet discharge member 7 from FIG. 1, together with the cutting unit 100. Referring to FIGS. 1 and 3, the sheet discharge member 7 is provided at a downstream side of the cut line 103 on the recording medium 101, in the conveying direction, and serves as a guide member in conveying the recording medium 101 from the recording part to the exterior of the main body of the apparatus. In the present embodiment, the sheet discharge member 7 also serves as a cover member for covering the recording medium stored as a wound roll. The sheet discharge member 7 is provided, on an upper surface thereof, with a linear portion 7a constituting a flat surface over a predetermined length in the conveying direction, and with a curved portion 7b curved downwards in a downstream portion in the conveying direction. The curved portion 7b is provided, along the widthwise direction of the recording medium 101, with friction members 11 (11a, 11b, 11c and 11d).

The friction members 11 are constituted of plural friction members 11a, 11b, 11c and 11d, which are fixed with predetermined gaps along the widthwise direction of the recording medium 101. That is to say, the friction members 11 are provided partially on the curved portion 7b, along the widthwise direction of the recording medium. These friction members 11 (11a, 11b, 11c, 11d) are provided for causing a frictional force on the recording medium 101 in a cutting operation thereof, and are formed by a material of a higher frictional coefficient than in the sheet discharge member 7.

The sheet discharge member 7 can be formed, for example, of a stainless steel plate, a steel plate or a hard plastic material. On the other hand, the friction members 11 can be formed, for example, of a plate-shaped or sheet-shaped material of a relatively high frictional coefficient, such as a rubber-like elastomer, a plastic material, a leather, a synthetic leather or a cloth. Also for increasing the frictional coefficient, there may be employed a surface treatment (painting or plating) or a irregularity formation (such as knurling or napping).

Figure 4:
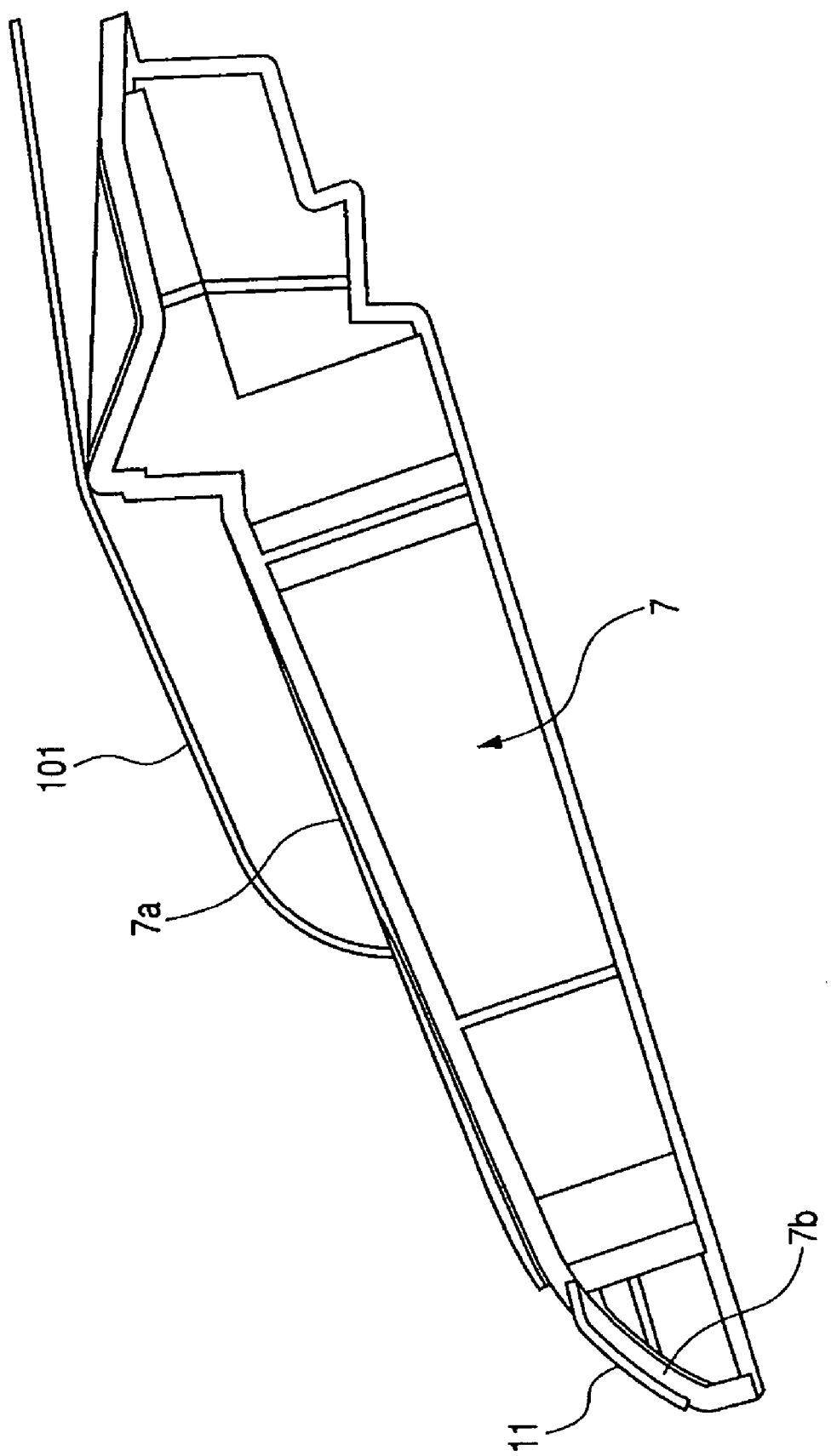
FIG. 4 is a schematic cross-sectional view showing a state where a recording medium is conveyed along a sheet discharge member and a leading end of the recording medium is positioned at a linear portion of the sheet discharge member, according to an aspect of the present invention.
Figure 5:
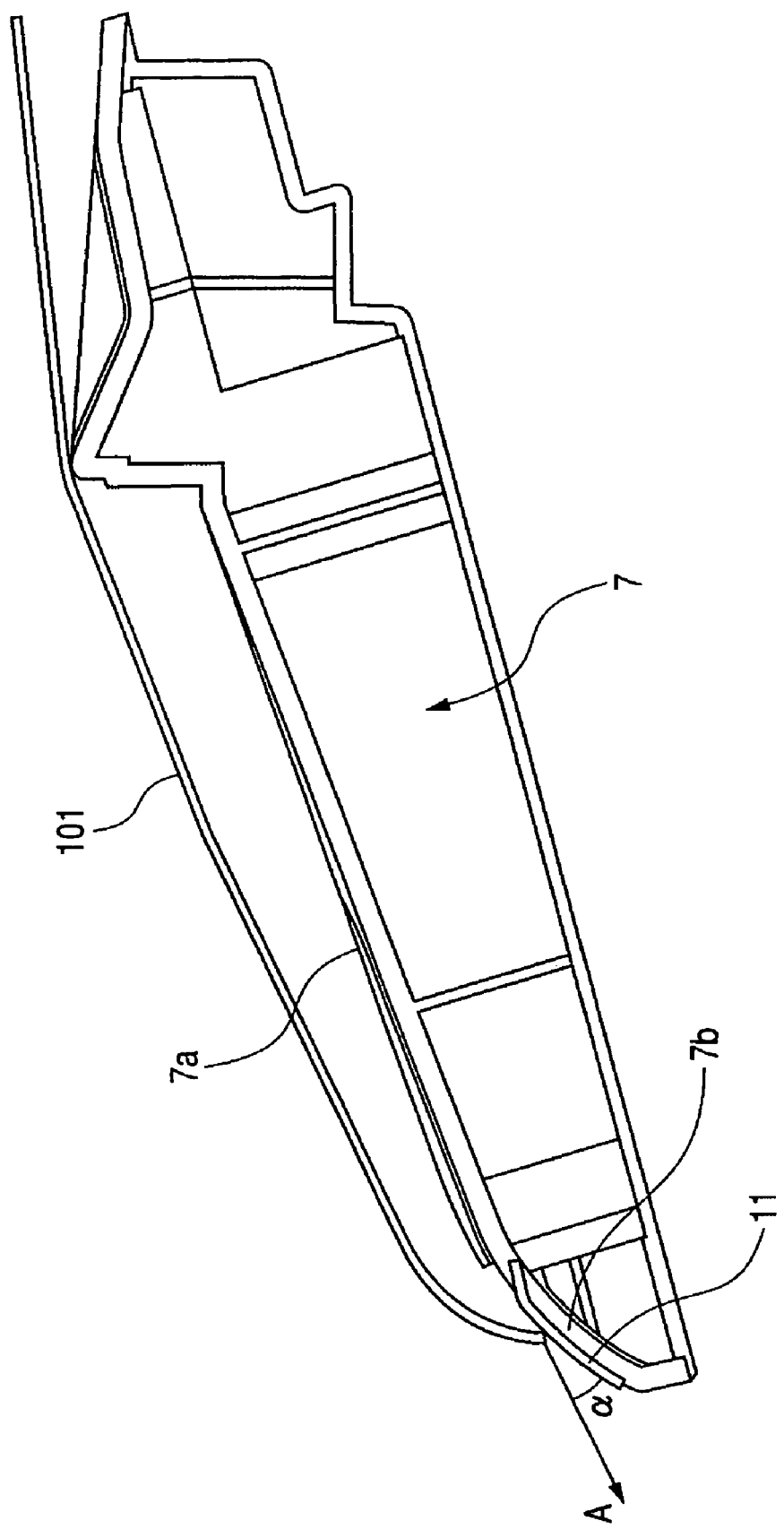
FIG. 5 is a schematic cross-sectional view showing a state where a recording medium is conveyed along a sheet discharge member and a leading end of the recording medium is positioned at a curved portion of the sheet discharge member, according to an aspect of the present invention.

FIGS. 4 and 5 are schematic vertical cross-sectional views showing states where the recording medium 101 is conveyed along the sheet discharge member 7, wherein FIG. 4 shows a state where a leading end of the recording medium is positioned on the linear portion 7a of the sheet discharge member, and while FIG. 5 shows a state where a leading end of the recording medium is positioned on the curved portion 7b of the sheet discharge member. Referring to FIGS. 1 to 5, the recording medium 101 is conveyed, at an image recording, by the conveying rollers 3 intermittently with a predetermined pitch, along the conveying direction. As the recording medium 101 is rolled prior to the recording, the leading end thereof is conveyed in a curled state on the sheet discharge member 7.

In the present embodiment, when the leading end of the recording medium is positioned on the linear portion 7a of the sheet discharge member 7, only little frictional force is generated between the leading end of the recording medium 101 and the sheet discharge member 7, whereby the recording medium 101 is not trapped at the leading end thereof by the sheet discharge member 7 nor is lifted from the platen 4. On the other hand, when the leading end of the recording medium 101 is positioned on the curved portion 7b in the downstream portion of the sheet discharge member 7 as shown in FIG. 5, the leading end of the recording medium 101 comes into contact with the friction members 11 (11a, 11b, 11c, 11d) provided at predetermined spacing along the widthwise direction.

These friction members 11, being positioned on the curved portion 7b, have a surface inclined by an angle α from the conveying direction (indicated by an arrow A) of the recording medium 101. Consequently, the frictional force acting between the leading end of the recording medium 101 and the friction members 11 is significantly reduced, whereby the recording medium 101 is not trapped at the leading end thereof by the friction members 11 (11a, 11b, 11c, 11d) nor is lifted from the platen 4.

FIG. 6 is a schematic vertical cross-sectional view showing a state where the recording medium, conveyed from the recording part, is cut and discharged. Referring to FIGS. 1 to 6, after an image recording on an entire page, the recording medium 101 is conveyed by the conveying rollers 3 to a predetermined cutting position. In the cutting position, the circular blade unit 120 is driven with respect to the fixed blade unit 110, from left to right along an arrow B, whereby the recording medium 101 is cut along the cut line 103 by the fixed blade 6 and the circular blade 24. In a prior image recording apparatus, in case the recording medium 101 has a large size such as 1.0 m$^2$ (A0 size) or 1.5 m$^2$ (B0 size) or larger, an already cut portion of the recording medium 101 is displaced downwards by a weight thereof, even in the course of a cutting operation.

In the present embodiment, however, the friction members 11 (11a, 11b, 11c and 11d) come into contact with the recording medium 101 in the cutting operation thereof, thereby generating a frictional force between the recording medium 101 and the friction members 11. The frictional force functions so as to prevent the already cut portion of the recording medium 101 from displacing downwards by the weight thereof, in the course of the cutting operation. Therefore, the recording medium 101 does not show a downward displacement of the already cut portion in the course of the cutting operation, and can therefore be easily and linearly cut.

The recorded portion 101a cut into a sheet is discharged onto the stacking member 8 provided below the sheet discharge member 7. In this operation, the recorded portion 101a cut into a sheet is discharged by the weight thereof and a pushing force of the recording medium 101 remaining in the main body of the apparatus. In the present embodiment, since the friction members 11a, 11b, 11c and 11d are provided in predetermined partial areas on the sheet discharge member 7, the frictional force between the recorded and cut portion 101a and the friction members 11a, 11b, 11c and 11d may be so selected as to be smaller than a sum of the weight of the recorded and cut portion 101a and the pushing force of the recording medium 101. By selecting the frictional force in this manner, the recorded and cut portion 101a can be securely discharged without remaining on the sheet discharge member 7.

In the embodiment explained in the foregoing, since the friction members 11a, 11b, 11c and 11d are provided within a predetermined widthwise range on a surface of the sheet discharge member 7 on which the recording medium 101 passes, the frictional force generated between the recording medium 101 and the friction members allows to prevent a displacement of the recording medium 101 by the weight thereof (downward displacement) in the course of a cutting operation. It is thus rendered possible to avoid situations where the cut edge is curved and deviated from the cut line 103 or the recording medium is torn off in an end portion of the cut edge, thereby enabling to cut the recording medium 101 easily and linearly.

Also since the friction members 11a, 11b, 11c and 11d are provided within a predetermined widthwise range of the sheet discharge member 7, the frictional force generated between the recorded and cut portion 101a and the friction members 11 does not become excessively large and the recorded and cut portion 101a can be securely discharged without remaining on the sheet discharge member 7. Also since the utilized frictional force is generated between the rear surface of the recording medium 101 and the friction members 11, the recording medium 101 can be securely cut without damaging the recorded image even in case of recording a frameless image. Also as the friction members 11 are positioned in the curved portion 7b of the sheet discharge member 7, the leading end of the recording medium is not trapped by the friction members 11 at the image recording on the recording medium 101, which can be exactly conveyed in a stable state.

The above-described embodiment provides an image recording apparatus including conveying unit 3 for conveying a roll-shaped recording medium, a recording head 1 for recording an image on the recording medium conveyed by the conveying unit, a sheet discharge member 7 for guiding the recording medium, after the image recording, to the exterior, and cutting unit 100 for cutting the recording medium conveyed by the conveying unit, wherein friction members 11a, 11b, 11c, 11d positioned along a widthwise direction are provided on a surface, for conveying the recording medium 101, of the sheet discharge member 7, whereby a frictional force is generated between the friction members 11 and the recording medium 101 to prevent a damage on a recording surface in case of recording a frameless image without resulting in bulkiness or complication of the apparatus, and also to prevent a downward displacement of an already cut portion of the recording medium by the weight thereof in the course of a cutting operation thereby enabling easy and exact cutting along the cut line, and further to prevent that the recording medium is torn off in the end portion of the cutting operation.

Also as the friction members 11 are provided in the curved portion 7b curved downward from the conveying direction on the sheet discharge member, the leading end of the recording medium 101 is not trapped in the conveying operation thereof by the friction members 11, whereby the recording medium can be exactly conveyed in a more stable state. Also as the friction members 11 are partially provided in the widthwise direction of the sheet discharge member 7, the cut recording medium can be securely discharged without remaining on the sheet discharge member 7.

The foregoing embodiment has been explained by an image recording apparatus of serial type in which an image is recorded under a displacement of the recording head 1 along the recording medium 101, but the present invention is applicable also to and effective likewise in an image recording apparatus of line type in which an image is recorded only by a sub scanning operation of advancing the recording medium in the conveying direction. Also the present invention is applicable to and effective in not only an ink jet image recording apparatus in which an image is formed by discharging ink from a recording head, but also image recording apparatuses of other types such as thermal transfer type, thermal type, laser beam irradiation type or a wire dot type. Furthermore, the present invention is applicable regardless of a number or a type of the recording head, such as a case of utilizing only one recording head and a case of utilizing plural recording heads different in color or density.

Furthermore, the present invention is applicable not only to a single image recording apparatus, but also is widely applicable to and similarly effective in an apparatus executing an image recording based on image information for example an image recording apparatus in a composite equipment such as a copying apparatus, a facsimile apparatus or a pickup image recording apparatus, or an image recording apparatus as an output equipment of a composite system such as a computer system.

This application claims the benefit of Japanese Patent Application No. 2005-024827, filed Feb. 1, 2005, which is hereby incorporated by reference herein.

What is claimed is:

1. An image recording apparatus comprising:
   a conveying unit configured to convey a recording medium unwound from a roll-shaped recording medium;
   a recording head adapted to record an image on the recording medium conveyed by the conveying unit;
   a cutting unit disposed downstream of the recording unit and configured to cut the recording medium; and
   a guide member disposed downstream of the cutting unit and configured for guiding the recording medium to discharge the recording medium,
   wherein the guide member is provided with at least one friction member on a surface of the guide member, the at least one friction member configured to come into contact with a lower surface of the recording medium,
   wherein the image recording apparatus does not have a pinching unit for pinching the recording medium at the downstream side of the cutting unit so that the recording medium cut by the cutting unit drops by a weight of the recording medium,
   wherein a frictional force of the at least one friction member functions so as to prevent the already cut portion of the recording medium from displacing downwards by the weight thereof, in the course of the cutting operation.

2. An image recording apparatus according to claim 1, wherein the at least one friction member is provided on a curved portion of the guide member which curves downwards from a conveying direction.

3. An image recording apparatus according to claim 1, wherein the at least one friction member is a plurality of friction members provided in a widthwise direction of the guide member in spaced intervals.

4. An image recording apparatus according to claim 1, wherein a pinching unit is provided upstream of the cutting unit.

* * * * *